US011068794B2

(12) United States Patent
Bagchi et al.

(10) Patent No.: US 11,068,794 B2
(45) Date of Patent: *Jul. 20, 2021

(54) LEVERAGING AN EXTERNAL ONTOLOGY FOR GRAPH EXPANSION IN INFERENCE SYSTEMS

(71) Applicant: International Business Machines Corporation, Armonk, NY (US)

(72) Inventors: Sugato Bagchi, White Plains, NY (US); Michael A. Barborak, New York, NY (US); Kenneth J. Barker, Mahopac, NY (US); Jennifer Chu-Carroll, Dobbs Ferry, NY (US); James J. Fan, Mountain Lakes, NJ (US); John M. Prager, Pomona, NY (US)

(73) Assignee: International Business Machines Corporation, Armonk, NY (US)

( * ) Notice: Subject to any disclaimer, the term of this patent is extended or adjusted under 35 U.S.C. 154(b) by 727 days.

This patent is subject to a terminal disclaimer.

(21) Appl. No.: 15/910,266

(22) Filed: Mar. 2, 2018

(65) Prior Publication Data

US 2018/0189663 A1 Jul. 5, 2018

Related U.S. Application Data

(63) Continuation of application No. 14/621,730, filed on Feb. 13, 2015, now Pat. No. 9,940,584.

(51) Int. Cl.
*G06N 5/04* (2006.01)

(52) U.S. Cl.
CPC .................. *G06N 5/04* (2013.01)

(58) Field of Classification Search
CPC ............ G06N 5/04; G06N 5/02; G06N 5/022; G06N 5/041

(Continued)

(56) References Cited

U.S. PATENT DOCUMENTS

| 8,739,016 B1* | 5/2014 | Goldman | ............... G06Q 50/01 715/200 |
| 2003/0018616 A1* | 1/2003 | Wilbanks | ........... G06F 17/30286 |

(Continued)

FOREIGN PATENT DOCUMENTS

| EP | 2630593 A1 | 8/2013 |
| EP | 2757510 A1 | 7/2014 |

(Continued)

OTHER PUBLICATIONS

Sheth A. et al., "Relationships at the Heart of Semantic Web: Modeling, Discovering, and Exploiting Complex Semantic Relationships", Enhancing the Power of the Internet, Springer-Verlag Berlin Heidelberg, 2004. (Previously provided). (Year: 2004).*

(Continued)

*Primary Examiner* — Dave Misir
(74) *Attorney, Agent, or Firm* — Stephen R. Tkacs; Stephen J. Walder, Jr.; Ingrid M. Foerster

(57) ABSTRACT

A mechanism is provided in a data processing system for exploring knowledge. The mechanism receives a set of known facts. The mechanism traverses paths in an ontology for a domain of knowledge from known facts in the set of known facts to one or more hypotheses. The ontology includes a plurality of entity types and a plurality of relationships between the entity types. The mechanism presents one or more hypotheses to a user.

19 Claims, 4 Drawing Sheets

(58) Field of Classification Search
USPC .......................................................... 706/11
See application file for complete search history.

(56) References Cited

U.S. PATENT DOCUMENTS

| | | | |
|---|---|---|---|
| 2007/0178473 A1* | 8/2007 | Chen ...................... | G06F 19/12 435/6.11 |
| 2009/0287678 A1 | 11/2009 | Brown et al. | |
| 2011/0066587 A1 | 3/2011 | Ferrucci et al. | |
| 2011/0125734 A1 | 5/2011 | Duboue et al. | |
| 2012/0078837 A1* | 3/2012 | Bagchi ..................... | A61B 5/00 706/52 |
| 2013/0007055 A1 | 1/2013 | Brown et al. | |
| 2013/0018652 A1 | 1/2013 | Ferrucci et al. | |
| 2013/0030827 A1 | 1/2013 | Snyder et al. | |
| 2013/0066886 A1 | 3/2013 | Bagchi et al. | |
| 2013/0073571 A1 | 3/2013 | Coulet et al. | |
| 2013/0275345 A1* | 10/2013 | Shironoshita ............ | G06N 5/02 706/11 |
| 2013/0275448 A1* | 10/2013 | Mirhaji ............. | G06F 17/30312 707/756 |
| 2014/0108071 A1 | 4/2014 | Boaz et al. | |
| 2015/0081711 A1* | 3/2015 | Harris ................ | G06F 17/3043 707/737 |

FOREIGN PATENT DOCUMENTS

| | | |
|---|---|---|
| WO | WO2012/053019 A1 | 4/2012 |
| WO | WO2013/008979 A1 | 1/2013 |

OTHER PUBLICATIONS

Atkinson-Abutridy et al., "A Semantically Guided and Domain-Independent Evolutionary Model for Knowledge Discovery From Texts", IEEE Transactions On Evolutionary Computation, vol. 7, No. 6, Dec. 2003. (Year: 2002).*

Forhecz et al., "An Ontology-based rule chaining algorithm for legal expert systems", CINTI 2011 • 12th IEEE International Symposium on Computational Intelligence and Informatics, Nov. 21-22, 2011, Budapest, Hungary. (Year: 2011).*

Ou et al., "An Entailment-Based Question Answering System over Semantic Web Data", ICADL 2011, LNCS 7008, pp. 311-320, 2011. (Year: 2011).*

Aleman-Meza, Boanerges et al., "Context-Aware Semantic Association Ranking", Semantic Web and Databases Workshop Proceedings, SWDB '03, vol. 3, Sep. 7-8, 2003, 18 pages.

Al-Yahya, Maha, "Ontology-Based Multiple Choice Question Generation", The Scientific World Journal vol. 2014, Article ID 274949, Mar. 26, 2014, 10 pages.

Aranguren, Mikel E. et al., "Ontology Design Patterns for Bio-Ontologies: a Case Study on the Cell Cycle Ontology", 10th Bio-Ontologies Special Interest Group Workshop 2007, Vienna, Austria, Jul. 20, 2007, 13 pages.

Deegan, Jennifer et al., "Formalization of Taxon-Based Constraints to Detect Inconsistencies in Annotation and Ontology Development", BMC Bioinformatics 11, No. 1, Oct. 25, 2010, 10 pages.

Eliassi-Rad, Tina et al., "Using Ontological Information to Accelerate Path-Finding in Large Semantic Graphs: A Probabilistic Approach", American Association for Artificial Intelligence, Jul. 2013, 6 pages.

Franzoni, Valentina et al., "Heuristics for Semantic Path Search in Wikipedia", ICCSA 2014, Part VI, LNCS 8584, Jun. 30-Jul. 3, 2014, 14 pages.

Gangemi, Aldo, "Ontology Design Patterns for Semantic Web Content", 4th International Semantic Web Conference, ISWC 2005, Galway, Ireland, Nov. 6-10, 2005, 15 pages.

Gonzalez-Beltran, Alejandra et al., "Ontology-Based Queries Over Cancer Data", Proceedings of the Workshop on Semantic Web Applications and Tools for Life Sciences, Berlin, Germany, Dec. 8-10, 2010, 15 pages.

Hammar, Karl et al., "The State of Ontology Pattern Research: A Systematic Review of ISWC, ESWC and ASWC 2005-2009", ISWC 2010, Workshop on Ontology Patterns, Shanghai, China, Nov. 7-11, 2010, 13 pages.

High, Rob, "The Era of Cognitive Systems: An Inside Look at IBM Watson and How it Works", IBM Corporation, Redbooks, Dec. 12, 2012, 16 pages.

Kohler, Sebastian et al., "Improving Ontologies by Automatic Reasoning and Evaluation of Logical Definitions", BMC Bioinformatics, Oct. 27, 2011, 8 pages.

Kuo, Yen-Ting et al., "Domain Ontology Driven Data Mining: A Medical Case Study", 2007 ACM SIGKDD Workshop on Domain Driven Data Mining (DDDM 2007), San Jose, California, Aug. 12, 2007, 7 pages.

Lenat, Douglas et al., "Harnessing Cyc to Answer Clinical Researchers' Ad Hoc Queries", AI Magazine 31, No. 3, Fall 2010, 20 pages.

Mccord, M.C. et al., "Deep parsing in Watson", IBM J. Res. & Dev. vol. 56 No. 3/4 Paper 3, May/Jul. 2012, pp. 3:1-3:15.

Ou, Shiyan et al., "Automatic Question Pattern Generation for Ontology-Based Question Answering", Proceedings of the Twenty-First International FLAIRS Conference (2008), Miami, Florida, May 15-17, 2008, 6 pages.

Palaniappan, Lakshmi et al., "An Ontology-based Question Answering Method with the use of Query Template", International Journal of Computer Applications vol. 9, No. 9, Nov. 2010, 5 pages.

Phillips, Joseph et al., "Ontology-Guided Knowledge Discovery in Databases", K-CAP '01, Proceedings of the 1st International Conference on Knowledge Capture, Victoria, British Columbia, Canada, Oct. 22-23, 2001, 8 pages.

Sabou, Marta et al., "SCARLET: Semantic Relation Discovery by Harvesting Online Ontologies", The 5th Annual European Semantic Web Conference (ESWC 2008), Tenerife, Spain, Jun. 1-5, 2008, 5 pages.

Sheth, Amit et al., "Relationships at the Heart of Semantic Web: Modeling, Discovering, and Exploiting Complex Semantic Relationships", Springer-Verlag Berlin Heidelberg, Enhancing the Power of the Internet, Studies in Fuzziness and Soft Computing, vol. 139, 2004, pp. 63-94.

Wu, Yinghui et al., "Ontology-based Subgraph Querying", ICDE 2013, 29th IEEE International Conference on Data Engineering, Brisbane, Australia, Apr. 8-11, 2013, 12 pages.

Yuan, Michael J., "Watson and healthcare, How natural language processing and semantic search could revolutionize clinical decision support", IBM Corporation, IBM developerWorks, http://www.ibm.com/developerworks/industry/library/ind-watson/, Apr. 12, 2011, 14 pages.

List of IBM Patents or Patent Applications Treated as Related, Mar. 2, 2018, 2 pages.

* cited by examiner

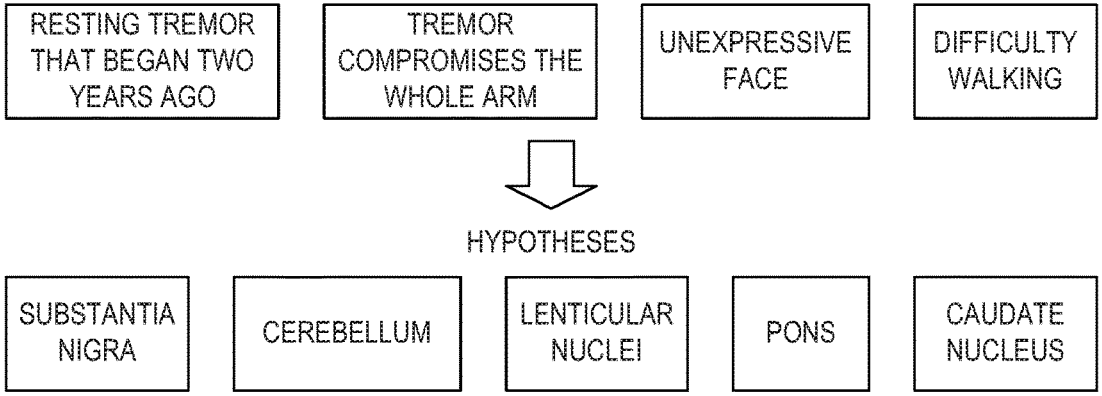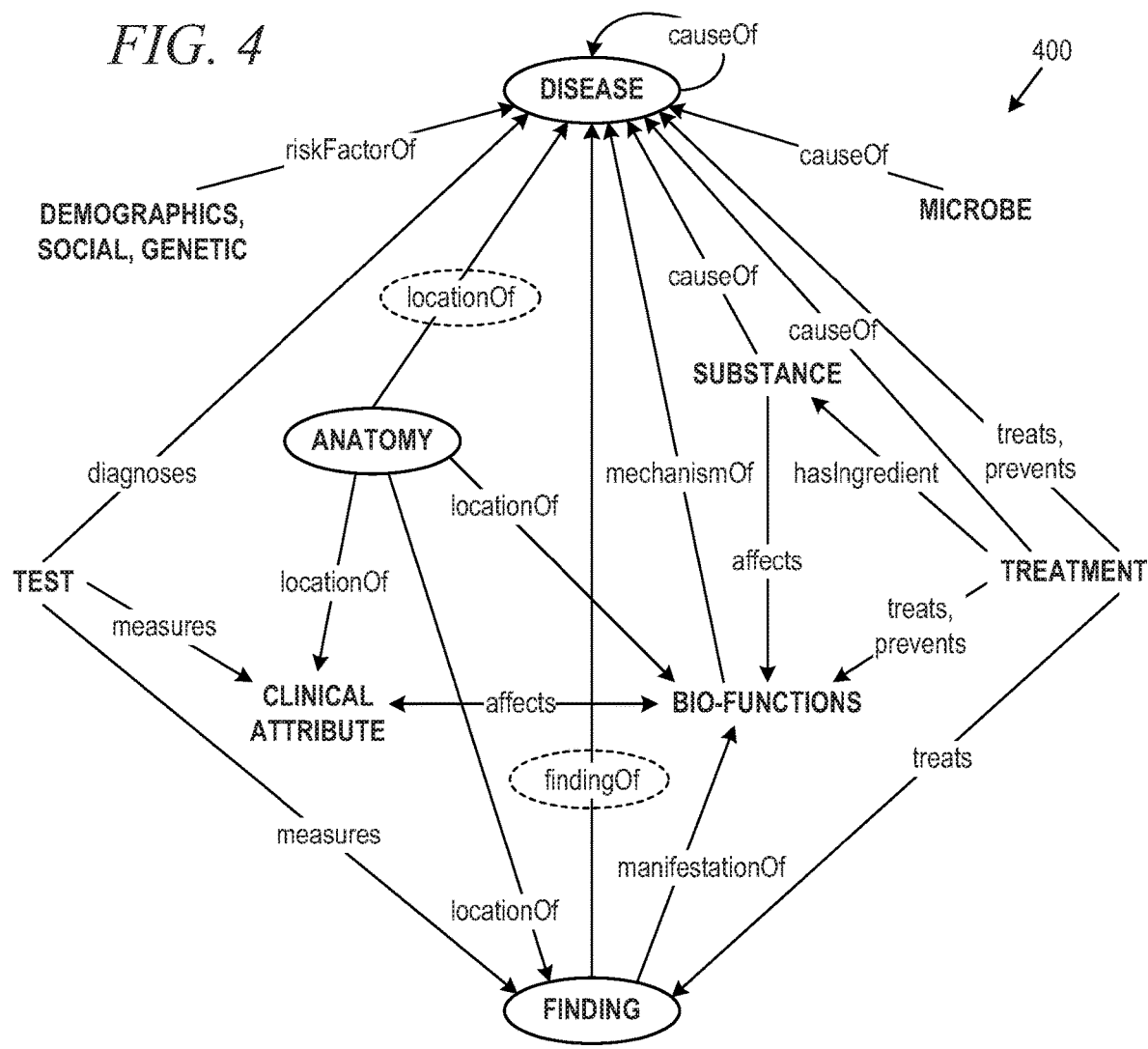

LEVERAGING AN EXTERNAL ONTOLOGY FOR GRAPH EXPANSION IN INFERENCE SYSTEMS

BACKGROUND

The present application relates generally to an improved data processing system and method and more specifically to mechanisms for leveraging an external ontology for graph expansion in inference systems.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating question and answer (QA) systems which may take an input question, analyze it, and return results indicative of the most probable answer to the input question. QA systems provide automated mechanisms for searching through large sets of sources of content, e.g., electronic documents, and analyze them with regard to an input question to determine candidate answers to the question and confidence measures representing probabilities that a candidate answer correctly answers the input question.

The IBM Watson™ system is an application of advanced natural language processing, information retrieval, knowledge representation and reasoning, and machine learning technologies to the field of open domain question answering. The IBM Watson™ system is built on IBM's DeepQA technology used for hypothesis generation, massive evidence gathering, analysis, and scoring. IBM Watson™ takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

WatsonPaths is an exploratory system from IBM Research that builds on the IBM Watson™ question answering system. WatsonPaths breaks down an input scenario into individual pieces of information, asks relevant sub-questions of IBM Watson™ to conclude new information, and represents these results in a graphical model. Probabilistic inference is performed over the graph to conclude an answer.

SUMMARY

In one illustrative embodiment, a method, in a data processing system, is provided for exploring knowledge. The method comprises receiving, by the data processing system, a set of known facts. The method further comprises traversing, by the data processing system, paths in an ontology for a domain of knowledge from known facts in the set of known facts to one or more hypotheses. The ontology includes a plurality of entity types and a plurality of relationships between the entity types. The method further comprises presenting, by the data processing system, the one or more hypotheses.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 3 depicts known facts and hypotheses for an example for guided exploration in accordance with an illustrative embodiment;

FIG. 4 depicts an example of an ontology for guided search in accordance with an illustrative embodiment;

DETAILED DESCRIPTION

Figure 1:
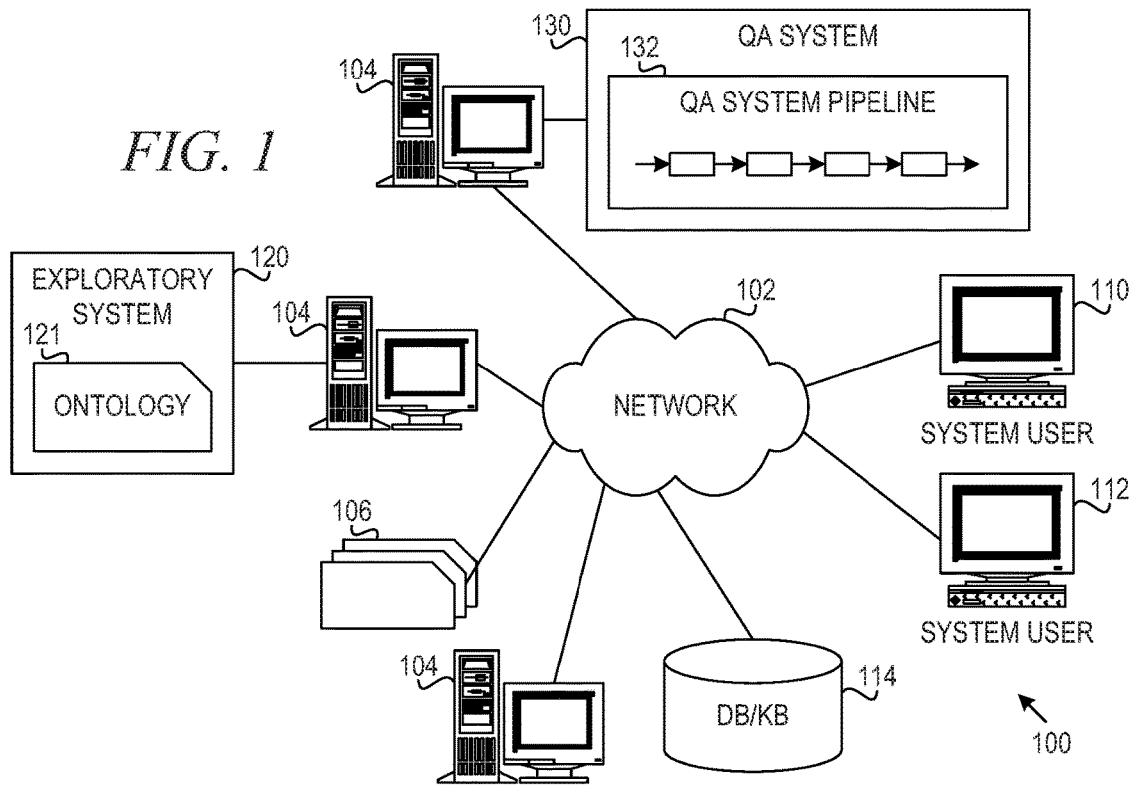
FIG. 1 depicts a schematic diagram of one illustrative embodiment of a exploratory system in a computer network.

The illustrative embodiments provide mechanisms for leveraging an external ontology for graph expansion in inference systems. Inference systems may be used to explore hypotheses by inferring new beliefs from known facts which may eventually validate one or more hypotheses. However, given any fact, there are many directions to explore to derive new beliefs. The illustrative embodiments provided herein may be used to effectively constrain the search space to explore beliefs more likely to lead to the hypotheses.

A mechanism of the illustrative embodiments obtains or builds an external domain ontology consisting of entity types and relationships between them. The ontology is specific for a particular domain of knowledge and may be built by an expert in the field. The mechanism identifies entity types of known facts and hypotheses in the ontology. The mechanism then builds chains of entity types and relationships that link from the types of known facts to the types of hypotheses. The mechanism instantiates the chains with known facts and instantiates adjacent nodes by finding new entities that satisfy the given relationships on the chains. The mechanism then continues to expand the chains and compare the end nodes in the chain to the hypotheses.

In one embodiment, the mechanisms instantiate nodes through database (DB) or knowledge base (KB) lookup. The mechanisms submit queries to the database that correspond to the relationships defined in the domain ontology and receive entities that satisfy these relationships. An embodiment using a database or knowledge base is simple and cost effective to implement.

In an alternative embodiment, the mechanisms instantiate nodes using a question answering (QA) system. The mechanisms submit questions to the QA system to identify entities that satisfy the relationships in the chains built from the ontology. Such a question may be formed as follows: What <entity> has <relationship> with <known entity>? Of course, in yet another embodiment, the mechanisms may instantiate nodes both using DB/KB lookup and using a QA system.

The mechanisms of the illustrative embodiments determine hypotheses based on results of completing the chains from the ontology. The nodes at the end of the chains represent the hypotheses. Each hypothesis may have a confidence value, which may be determined based on one or more answer confidence values from a QA system in an embodiment that uses a QA system to instantiate the nodes of the chains. The mechanisms may rank the hypotheses and output the ranked hypotheses as new inferred beliefs that guide the user to focus on more promising paths for exploration.

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
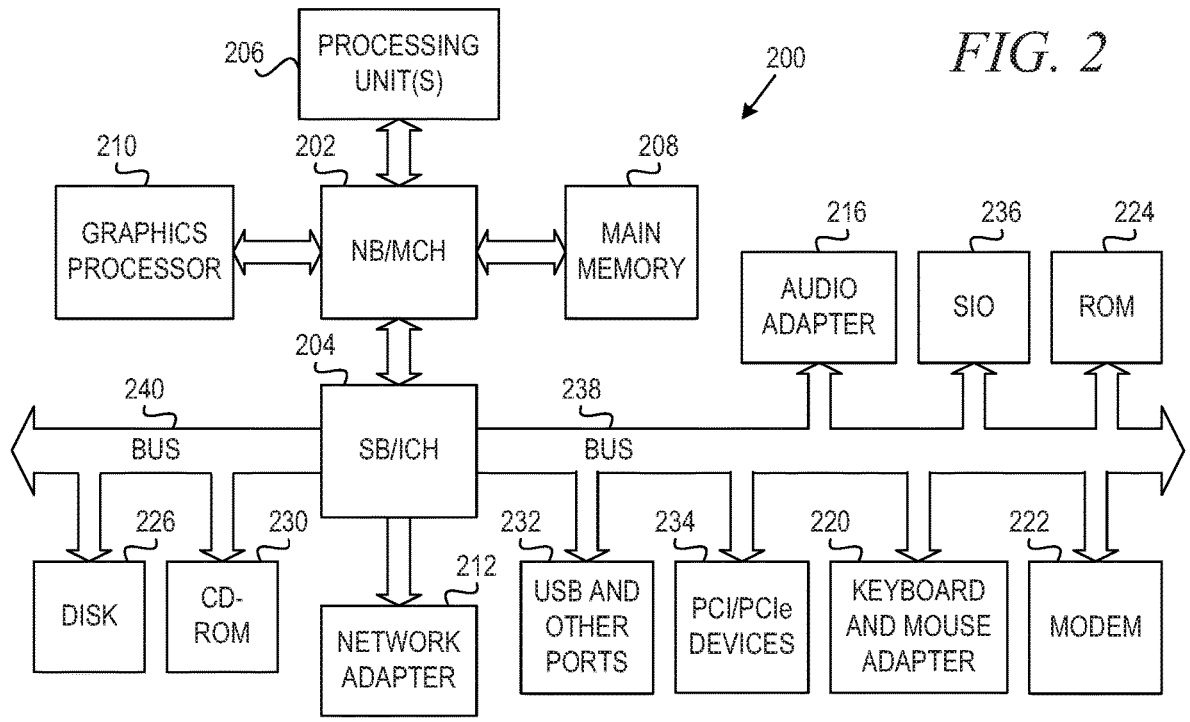
FIG. 2 is a block diagram of an example data processing system in which aspects of the illustrative embodiments are implemented.

The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIGS. 1 and 2 are directed to describing an example inference system, methodology, and computer program product with which the mechanisms of the illustrative embodiments are implemented. As will be discussed in greater detail hereafter, the illustrative embodiments are integrated in, augment, and extend the functionality of these inference mechanisms with regard to inferring new beliefs based on known facts using an external ontology for a domain of knowledge.

FIG. 1 depicts a schematic diagram of one illustrative embodiment of an exploratory system 120 in a computer network 102. One example of a question/answer generation, which may be used in conjunction with the principles described herein, is described in U.S. Patent Application Publication No. 2011/0125734, which is herein incorporated by reference in its entirety. The exploratory system 120 and QA system 130 are implemented on one or more computing devices 104 (comprising one or more processors and one or more memories, and potentially any other computing device elements generally known in the art including buses, storage devices, communication interfaces, and the like) connected to the computer network 102. The network 102 includes multiple computing devices 104 in communication with each other and with other devices or components via one or more wired and/or wireless data communication links, where each communication link comprises one or more of wires, routers, switches, transmitters, receivers, or the like. The exploratory system 120, QA system 130, and network 102 enable inference system functionality for one or more system users via their respective computing devices 110-112. Other embodiments of exploratory system 120 and QA system 130 may be used with components, systems, subsystems, and/or devices other than those that are depicted herein.

Exploratory system 120 and QA system 130 receive input from the network 102, a corpus of electronic documents 106, system users, and/or other data and other possible sources of input. In one embodiment, some or all of the inputs to the QA system 100 are routed through the network 102. The various computing devices 104 on the network 102 include access points for content creators and system users. Some of the computing devices 104 include devices for a database storing the corpus of data 106 (which is shown as a separate entity in FIG. 1 for illustrative purposes only). Portions of the corpus of data 106 may also be provided on one or more other network attached storage devices, in one or more databases, or other computing devices not explicitly shown in FIG. 1. The network 102 includes local network connections and remote connections in various embodiments, such that the exploratory system 120 and QA system 130 may operate in environments of any size, including local and global, e.g., the Internet.

In one embodiment, the content creator creates content in a document of the corpus of data 106 for use as part of a corpus of data with the exploratory system 120 and QA system 130. The document includes any file, text, article, or source of data for use in the QA system 130. QA system users access the QA system 130 via a network connection or an Internet connection to the network 102, and input questions to the QA system 130 that are answered by the content in the corpus of data 106. In one embodiment, known facts and questions are formed using natural language. The exploratory system 120 parses and interprets the known facts and questions, and provides a response to the system user, e.g., system user 110, containing one or more hypotheses or paths for exploration. In some embodiments, the exploratory system 120 provides a response to users in a ranked list of hypotheses.

Exploratory system 120 builds or obtains ontology 121, which consists of entity types and relationships between the entity types. An example of an ontology 121 is described in further detail below with respect to FIG. 4. Ontology 121 is a static, external domain ontology specific to a particular domain, such as a field of medicine, technical support, automobile maintenance, economics, finance, etc. An example of a static, external ontology is the Unified Medical Language System (UMLS), which is a compendium of many controlled vocabularies in the biomedical sciences. UMLS provides a mapping structure among these vocabularies and allows one to translate among the various terminology systems; it may also be viewed as a comprehensive thesaurus and ontology of biomedical concepts. UMLS further provides facilities for natural language processing. It is intended to be used mainly by developers of systems in medical informatics. Exploratory system 120 identifies entity types of known facts and hypotheses in ontology 121. Exploratory system 120 builds chains of entity types and relationships that link from the types of known facts to the types of hypotheses.

The exploratory system 120 instantiates the chains with known facts and instantiates adjacent nodes by finding new entities that satisfy the given relationships in the chains. In one embodiment, exploratory system 120 instantiates unknown arguments through lookup in database (DB) or knowledge base (KB) 114. In an illustrative embodiment, exploratory system 120 continues expanding the chains by submitting questions to QA system 130 and receiving candidate answers to the question having associated confidence values. Exploratory system 120 then determines confidence values for hypotheses based on answer confidence values from QA system 130.

The QA system 130 implements a QA system pipeline 132 which comprises a plurality of stages for processing an input question and the corpus of data 106. The QA system pipeline 132 generates answers for the input question based on the processing of the input question and the corpus of data 106.

In some illustrative embodiments, the QA system 130 may be the IBM Watson™ QA system available from International Business Machines Corporation of Armonk, N.Y., which is augmented with the mechanisms of the illustrative embodiments described hereafter. While the IBM Watson™ QA system is described herein as an example, the illustrative embodiments are not intended to be limited to the IBM Watson™ QA system. As outlined previously, the IBM Watson™ QA system receives an input question which it then parses to extract, the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question. The IBM Watson™ QA system then performs deep analysis on the language of the input question and the language used in each of the portions of the corpus of data found during the application of the queries using a variety of reasoning algorithms. The scores obtained from the various reasoning algorithms are then weighted against a statistical model that summarizes a level of confidence that the IBM Watson™ QA system has regarding the evidence that the potential response, i.e. candidate answer, is inferred by the question. This process is be repeated for each of the candidate answers to generate ranked listing of candidate answers which may then be presented to the user that submitted the input question, or from which a final answer is selected and presented to the user. More information about the IBM Watson™ QA system may be obtained, for example, from the IBM Corporation website, IBM Redbooks, and the like. For example, information about the IBM Watson™ QA system can be found in IBM Journal of Research and Development special issue on Watson in Jeopardy!, vol 56, nos 3-4, 2012.

FIG. 2 is a block diagram of an example data processing system in which aspects of the illustrative embodiments are implemented. Data processing system 200 is an example of a computer, such as server 104 or client 110 in FIG. 1, in which computer usable code or instructions implementing the processes for illustrative embodiments of the present invention are located. In one illustrative embodiment, FIG. 2 represents a server computing device, such as a server 104, which, which implements a QA system 100 and QA system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 is connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240, HDD 226 and CD-ROM drive 230 may use, for example, an integrated drive electronics (IDE) or serial advanced technology attachment (SATA) interface. Super I/O (SIO) device 236 is connected to SB/ICH 204.

An operating system runs on processing unit 206. The operating system coordinates and provides control of various components within the data processing system 200 in FIG. 2. As a client, the operating system is a commercially available operating system such as Microsoft® Windows 8®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System P® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and are loaded into main memory 208 for execution by processing unit 206. The processes for illustrative embodiments of the present invention are performed by processing unit 206 using computer usable program code, which is located in a memory such as, for example, main memory 208, ROM 224, or in one or more peripheral devices 226 and 230, for example.

A bus system, such as bus 238 or bus 240 as shown in FIG. 2, is comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, includes one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 depicts known facts and hypotheses for an example for guided exploration in accordance with an illustrative embodiment. Consider the following example input text:

A 63-year-old patient is sent to the neurologist with a clinical picture of resting tremor that began 2 years ago. At first it was only the left hand, but now it compromises the whole arm. At physical exam, the patient has an unexpressive face and difficulty in walking, and a continuous movement of the tip of the first digit over the tip of the second digit of the left hand is seen at rest. What part of his nervous system is most likely affected?

As shown in FIG. 3, the exploratory system extracts several known facts from the above text. These facts include the following:

resting tremor that began two years ago;
tremor compromises the whole arm;
unexpressive face; and
difficulty walking.

In addition, the input text asks for a part of the nervous system; therefore, the hypotheses should be parts of the nervous system. The exploratory system may leave the hypotheses open or may determine known entities that are parts of the nervous system. In this case, the hypotheses include the following: substantia nigra, cerebellum, lenticular nuclei, pons, and caudate nucleus.

Using an unguided search, there are many directions to explore or derive new beliefs. For example, from a known fact of "difficulty walking," an unguided search may lead an exploratory system to consider the following concepts: abnormal gait, wheelchair, blood alcohol concentration, spinal stenosis, knee replacement, Parkinson's disease, and arthritis. An unguided search leads one to explore symptoms, treatments, and causes, some of which may not lead one to a useful hypothesis. The exploratory system of the illustrative embodiments attempts to link known facts to the hypotheses using guided search based on an ontology for the specific domain of knowledge.

FIG. 4 depicts an example of an ontology for guided search in accordance with an illustrative embodiment. In the depicted example, the ontology 400 is built for a particular field of knowledge, in this case medical diagnostics. Ontology 400 includes a plurality of entity types, shown as bold text, and a plurality of relationships between entity types, shown as labeled arrows between entity types. As shown in FIG. 4, ontology 400 includes the following entity types: disease, demographics, microbe, substance, anatomy, test, clinical attribute, bio-functions, treatment, and finding.

Ontology 400 also shows how the entity types are related to each other. For example, demographics may be a risk factor of a disease, a microbe may be a cause of a disease, a test may measure a clinical attribute, an anatomy may be a location of bio-functions, a treatment may treat a finding, and so forth.

The exploratory system identifies in ontology 400 the semantic types of known facts. In the example shown above, the known fact entities "resting tremor that began two years ago," "tremor comprises the Whole arm," "unexpressive face," and "difficulty walking" are of type "finding." The hypothesis entities "substantia nigra," "cerebellum," "lenticular nuclei," "pons," and "caudate nucleus" are of type "anatomy." The exploratory system identifies possible chains using ontology 400 that link from the types of known facts to the types of hypotheses.

Figure 5:
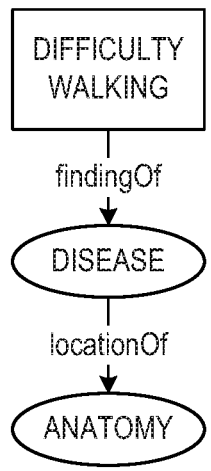
FIG. 5 depicts an example chain from a type of known fact to a type of hypothesis in accordance with an illustrative embodiment.

FIG. 5 depicts an example chain from a type of known fact to a type of hypothesis in accordance with an illustrative embodiment. In the depicted example, a path from "finding" to "anatomy" is as follows: <finding> findingOf <disease> locationOf <anatomy>. The exploratory system, using this guided search, then focuses on finding likely diseases that result in the known findings. That is, the exploratory system instantiates source nodes of the chains with known facts. In the example shown in FIG. 5, the exploratory system instantiates the <finding> entity with the known fact "difficulty walking."

The exploratory system then traverses the chains and instantiates the unknown argument of each relationship. In accordance with the illustrative embodiments, the exploratory system may generate questions for a question answering (QA) system. The exploratory system may then instantiate the unknown argument of a relationship with the answer returned from the QA system. Alternatively, the exploratory system may instantiate the unknown arguments through database (DB) or knowledge base (KB) lookup.

In one embodiment, the exploratory system uses slot filler templates to generate questions. The exploratory system inserts known facts into the slots of the slot filler templates to generate questions. In the above example, the exploratory system may generate slot filler templates automatically. For instance, given the example shown in FIG. 5, the exploratory system may generate the following slot filler templates: "<finding> is a finding of what disease?" and "What part of the anatomy is the location of <disease>?"

Given the known facts of the above example, the exploratory system would then generate the following question: "Difficulty walking is a finding of what disease?" The exploratory system would then submit this question to the QA system and receive the highest ranked answer(s). As an example, the QA system may return the following answer: "Difficulty walking is a finding of Parkinson's disease."

For a given question, for each instance of the chain created above, the QA system may return a plurality of high confidence answers. For example, several diseases may have a finding of "difficulty walking." In this case, according to one embodiment, the exploratory system generates an instance of the chain for each high confidence answer.

Then, the exploratory considers the next relationship and generates questions such as: "What part of the anatomy is the location of Parkinson's disease"? The exploratory system submits these questions to the QA system and receives the highest ranked answer(s). As an example, the QA system may return the following answer: "Parkinson's disease is located in the substantia nigra part of the nervous system."

For a given hypothesis resulting from a given chain or path, the exploratory system determines a confidence value. In one embodiment, the exploratory system determines the confidence value of a chain/hypothesis based on answer confidence values received from the QA system. In accordance with one embodiment, the exploratory system repeats the process for each path from a type of a known fact to a type of the hypotheses; however, some chains or paths will be more direct and/or have higher confidence values.

Considering ontology 400 in FIG. 4, a chain from "difficulty walking" to "knee replacement" would not result in a high confidence path leading to a hypothesis, even though there is possible path or chain through ontology 400 including this relationship. For example, "difficulty walking" (finding) is treated by "knee replacement" (treatment); however, "knee replacement" is not likely to lead via any path to a high confidence hypothesis for a part of the nervous system. Thus, the guided search using the domain ontology eliminates the need to visit nodes that do not lead to new beliefs that are useful.

Figure 6:
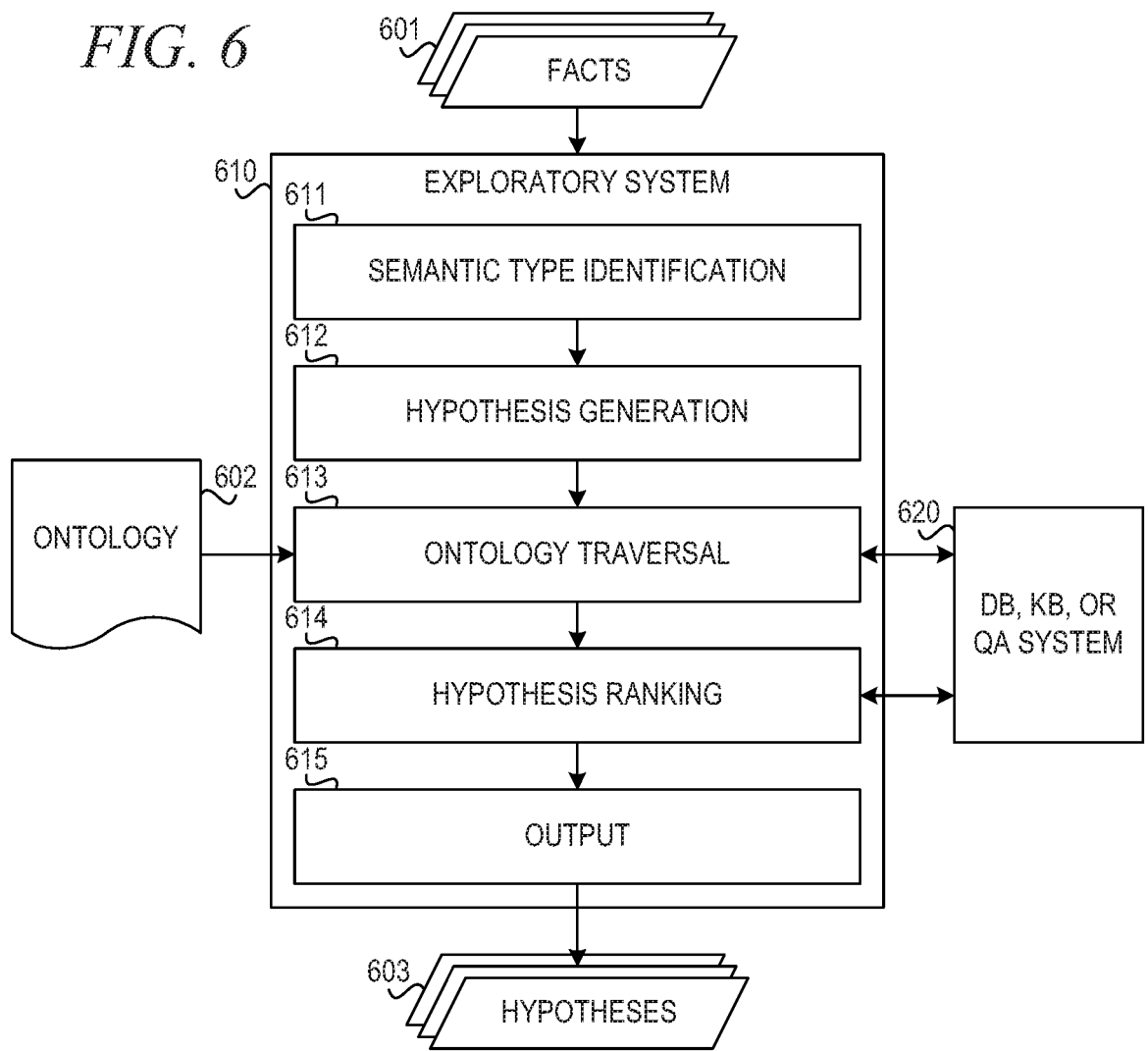
FIG. 6 is a block diagram of an exploratory inference system with guided search based on an external domain ontology in accordance with an illustrative embodiment.

FIG. 6 is a block diagram of an exploratory inference system with guided search based on an external domain ontology in accordance with an illustrative embodiment. Exploratory system 610 obtains or builds ontology 602, which is an external ontology for a given domain of knowledge. Ontology 602 includes a plurality of entity types and a plurality of relationships between entity types. Exploratory system 610 receives known facts 601 and generates hypotheses 603 for exploring new beliefs.

Exploratory system 610 incudes functional components 611-615 for determining the hypotheses 603 for inferring new beliefs based on known facts 601. In one embodiment, these functional components 611-615 comprise software modules executing on computer hardware resources, such as computing devices 104 in FIG. 1.

Semantic type identification component 611 identifies semantic types of known facts 601 within ontology 602. Hypothesis generation component 612 identifies a semantic type for hypotheses. For example, exploratory system 601 may receive an input text that identifies the known facts 601 and also implies a type for the hypotheses. Hypothesis generation component 612 may identify possible known entities that match the semantic type of the hypotheses. For example, if the input text asks for a part of the human anatomy, hypothesis generation component 612 may determine known parts of the human anatomy as initial hypotheses.

Ontology traversal component 613 identifies possible chains using ontology 602 that link from the types of known facts 601 to types of hypotheses. Ontology traversal component 613 instantiates source nodes of the chains with known facts 601. Ontology traversal component 613 traverses the chains and instantiates the unknown arguments of each relationship. Ontology traversal component 613 may instantiate the unknown arguments of each relationship through database or knowledge base lookup.

In an alternative embodiment, ontology traversal component. 613 traverses chains in reverse from types of hypothesis to the types of facts. For example, ontology traversal component 613 may instantiate a hypothesis node with a best guess hypothesis. Ontology traversal component 613 then may determine whether the chains lead to the known facts 601 to verify whether a given hypothesis is likely to be correct.

In an illustrative embodiment, ontology traversal component 613 instantiates the unknown arguments by performing a lookup in a database (DB) or knowledge base (KB) or by asking a question answering (QA) system 620. In one example embodiment using a QA system, ontology traversal component 613 generates questions using slot filler templates, as described above, submits the questions to a QA system, and receives answers based on a corpus of information for the appropriate domain of knowledge. Ontology traversal component 613 continues expanding the chains and comparing the end nodes to the hypotheses generated by component 612.

In one example embodiment, the QA system 620 also returns answers with answer confidence values. Hypothesis ranking component 614 ranks the hypotheses according to the answer confidence values. Hypothesis ranking component 614 may also rank hypotheses and assign confidence scores based on a number of chains arriving at the same hypothesis. Output component 615 outputs hypotheses 603 to the user. Output component 615 may present each hypothesis as a new belief to be explored. Output component 615 may also present a confidence value for each hypothesis.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network anchor a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the users computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 7:
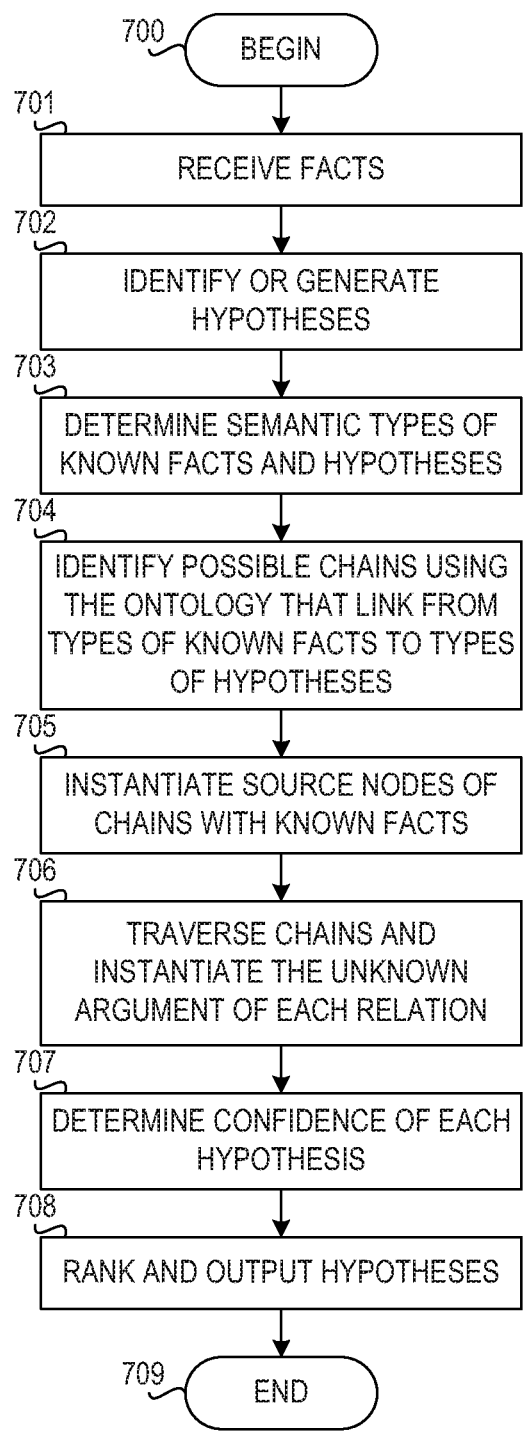
FIG. 7 is a flowchart illustrating operation of a mechanism for an exploratory inference system with guided search based on an external domain ontology in accordance with an illustrative embodiment.

FIG. 7 is a flowchart illustrating operation of a mechanism for an exploratory inference system with guided search based on an external domain ontology in accordance with an illustrative embodiment. Operation begins (block 700), and the mechanism receives known facts (block 701). The mechanism identifies or generates hypotheses (block 702). The mechanism determines semantic types of the known facts and the hypotheses (block 703). Then, the mechanism identifies possible chains using an external ontology for the domain of knowledge that link from the types of known facts to the types of hypotheses (block 704).

The mechanism instantiates the source nodes of the chains with the known facts (block 705). The mechanism traverses the chains and instantiates the unknown argument of each relationship (block 706). The mechanism may instantiate unknown arguments through database (DB) or knowledge base (KB) lookup, by asking a question answering system, or using both DB/KB lookup and asking a QA system. The mechanism may use slot filler templates to generate questions for the QA system, for example. The mechanism continues expanding the chains and compares the end nodes in the chains to the hypotheses.

The mechanism determines a confidence of each hypothesis (block 707). Then, the mechanism ranks and outputs the hypotheses (block 708). The mechanism may present the hypotheses as new beliefs to be explored. Thereafter, operation ends (block 709).

The flowchart, and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for exploratory knowledge discovery using inference systems. A knowledge expert may add a small domain-specific ontology focused on entities and relationships associated with the application use case. Graph expansion guided by promising relationships specified in the ontology result in much cleaner graphs and much more efficient processing. The inference system can be applied to new knowledge domains by simply adding a new ontology. The mechanisms of the illustrative embodiments can be used in exploratory systems to improve system efficiency and reduce noise. These mechanisms also can be used in an interactive system to guide the user to focus on more promising paths for expansion.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system having a processor and a memory, wherein the memory comprises instructions which are executed by the processor to cause the processor to implement an exploratory system for exploring knowledge, the method comprising:
    receiving, by the exploratory system, an ontology for a domain of knowledge, wherein the ontology includes a plurality of entity types and a plurality of relationships between the entity types;
    receiving, by the exploratory system, an input specifying a set of known facts and a semantic type of an unknown entity;
    identifying, by a semantic type identification component executing within the exploratory system, semantic types of the known facts;
    identifying, by a hypothesis generation component executing within the exploratory system, a set of hypotheses, wherein each hypothesis within the set of hypotheses comprises one or more known entities in the ontology that match the semantic type of the unknown entity;
    traversing, by an ontology traversal component executing within the exploratory system, a set of paths in the ontology from known facts in the set of known facts to the set of hypotheses, wherein traversing each given path within the set of paths in the ontology comprises for an unknown argument of a given relationship in the given path, submitting a question to a question answering system executing within the data processing system and receiving at least one candidate answer having an answer confidence value from the question answering system;
    ranking, by a hypothesis ranking component executing within the exploratory system, the set of hypotheses based on the answer confidence value to form a ranked set of hypotheses; and
    presenting, by an output component executing within the exploratory system, the ranked set of hypotheses.

2. The method of claim 1, wherein traversing the set of paths in the ontology comprises:
    determining the set of paths in the ontology from the semantic type of each known fact to the semantic type for the set of hypotheses.

3. The method of claim 2, wherein traversing the given path in the ontology comprises:
    instantiating a source node of the given path with a known fact in the set of known facts; and
    instantiating an unknown argument of each relationship in the given path based on the at least one candidate answer.

4. The method of claim 2, wherein traversing the given path in the ontology comprises:
    instantiating an end node of the given path with a hypothesis; and
    instantiating an unknown argument of each relationship in the given path based on the at least one candidate answer.

5. The method of claim 3, wherein instantiating the unknown argument of each relationship in the given path comprises looking up the relationship in a database or knowledge base.

6. The method of claim 1, wherein ranking the set of hypotheses comprises assigning a hypothesis confidence score to each hypothesis in the set of hypotheses based on the answer confidence value, wherein presenting the ranked set of hypotheses comprises presenting a hypothesis confidence value for each hypothesis in the ranked set of hypotheses.

7. The method of claim 6, wherein assigning the hypothesis confidence score for a given hypothesis comprises determining the hypothesis confidence score based on a number of paths leading to the given hypothesis.

8. A computer program product comprising a computer readable storage medium having a computer readable program stored therein, wherein the computer readable program, when executed on a processor of a data processing system, causes the data processing system to implement an exploratory system for exploring knowledge, wherein the computer readable program causes the data processing system to:
  receive, by the exploratory system, an ontology for a domain of knowledge, wherein the ontology includes a plurality of entity types and a plurality of relationships between the entity types;
  receive, by the exploratory system, an input specifying a set of known facts and a semantic type of an unknown entity;
  identify, by a semantic type identification component executing within the exploratory system, semantic types of the known facts;
  identify, by a hypothesis generation component executing within the exploratory system, a set of hypotheses, wherein each hypothesis within the set of hypotheses comprises one or more known entities in the ontology that match the semantic type of the unknown entity;
  traverse, by an ontology traversal component executing within the exploratory system, a set of paths in the ontology from known facts in the set of known facts to the set of hypotheses, wherein traversing each given path within the set of paths in the ontology comprises for an unknown argument of a given relationship in the given path, submitting a question to a question answering system executing within the data processing system and receiving at least one candidate answer having an answer confidence value from the question answering system;
  rank, by a hypothesis ranking component executing within the exploratory system, the set of hypotheses based on the answer confidence value to form a ranked set of hypotheses; and
  present, by an output component executing within the exploratory system, the ranked set of hypotheses.

9. The computer program product of claim 8, wherein traversing the set of paths in the ontology comprises:
  determining the set of paths in the ontology from the semantic type of each known fact to the semantic type for the set of hypotheses.

10. The computer program product of claim 9, wherein traversing the given path in the ontology comprises:
  instantiating a source node of the given path with a known fact in the set of known facts; and
  instantiating an unknown argument of each relationship in the given path based on the at least one candidate answer.

11. The computer program product of claim 10, wherein instantiating the unknown argument of each relationship in the given path comprises looking up the relationship in a database or knowledge base.

12. The computer program product of claim 8, wherein ranking the set of hypotheses comprises assigning a hypothesis confidence score to each hypothesis in the set of hypotheses based on the answer confidence value, wherein presenting the ranked set of hypotheses comprises presenting a hypothesis confidence value for each hypothesis in the ranked set of hypotheses.

13. The computer program product of claim 12, wherein assigning the hypothesis confidence score for a given hypothesis comprises determining the hypothesis confidence score based on a number of paths leading to the given hypothesis.

14. An apparatus comprising:
  a processor; and
  a memory coupled to the processor, wherein the memory comprises instructions which, when executed by the processor, cause the processor to implement an exploratory system for exploring knowledge, wherein the instructions causes the processor to:
  receive, by the exploratory system, an ontology for a domain of knowledge, wherein the ontology includes a plurality of entity types and a plurality of relationships between the entity types;
  receive, by the exploratory system, an input specifying a set of known facts and a semantic type of an unknown entity;
  identify, by a semantic type identification component executing within the exploratory system, semantic types of the known facts;
  identify, by a hypothesis generation component executing within the exploratory system, a set of hypotheses, wherein each hypothesis within the set of hypotheses comprises one or more known entities in the ontology that match the semantic type of the unknown entity;
  traverse, by an ontology traversal component executing within the exploratory system, a set of paths in the ontology from known facts in the set of known facts to the set of hypotheses, wherein traversing each given path within the set of paths in the ontology comprises for an unknown argument of a given relationship in the given path, submitting a question to a question answering system and receiving at least one candidate answer having an answer confidence value from the question answering system;
  rank, by a hypothesis ranking component executing within the exploratory system, the set of hypotheses based on the answer confidence value to form a ranked set of hypotheses; and
  present, by an output component executing within the exploratory system, the ranked set of hypotheses.

15. The apparatus of claim 14, wherein traversing the set of paths in the ontology comprises:
  determining the set of paths in the ontology from the semantic type of each known fact to the semantic type for the set of hypotheses.

16. The apparatus of claim 15, wherein traversing the given path in the ontology comprises:
  instantiating a source node of the given path with a known fact in the set of known facts; and
  instantiating an unknown argument of each relationship in the given path based on the at least one candidate answer.

17. The apparatus of claim 16, wherein instantiating the unknown argument of each relationship in the given path comprises looking up the relationship in a database or knowledge base.

18. The apparatus of claim 14, wherein ranking the set of hypotheses comprises assigning a hypothesis confidence score to each hypothesis in the set of hypotheses based on the answer confidence value, wherein presenting the ranked set of hypotheses comprises presenting a hypothesis confidence value for each hypothesis in the ranked set of hypotheses.

19. The apparatus of claim 18, wherein assigning the hypothesis confidence score for a given hypothesis comprises determining the hypothesis confidence score based on a number of paths leading to the given hypothesis.

* * * * *